(12) United States Patent
Kawazoe et al.

(10) Patent No.: US 7,219,031 B2
(45) Date of Patent: May 15, 2007

(54) RUMBLE STRIP RESPONSIVE SYSTEMS: DISCRIMINATION OF TYPES OF RUMBLE STRIPS

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 2 days.

(21) Appl. No.: 11/094,322

(22) Filed: Mar. 31, 2005

(65) Prior Publication Data

US 2006/0229840 A1    Oct. 12, 2006

(51) Int. Cl.
    G08B 1/00    (2006.01)
(52) U.S. Cl. .................. 702/147; 702/47; 702/56; 701/301; 701/1; 701/45; 701/213; 340/425.5; 340/436; 340/438; 340/940; 340/933
(58) Field of Classification Search ............... 702/147, 702/47, 56; 701/301, 1, 45, 213; 340/425.5, 340/436, 438, 940, 933
    See application file for complete search history.

(56) References Cited

U.S. PATENT DOCUMENTS

| 4,701,069 | A | | 10/1987 | Whitney |
| 5,582,490 | A | | 12/1996 | Murray |
| 5,676,490 | A | | 10/1997 | Nelson |
| 5,852,243 | A | * | 12/1998 | Chang et al. ................. 73/659 |
| 6,014,595 | A | | 1/2000 | Kobayashi |
| 6,210,071 | B1 | | 4/2001 | McSharry |
| 6,220,783 | B1 | | 4/2001 | Maxwell |
| 6,363,419 | B1 | | 3/2002 | Martin, Jr. et al. |
| 6,454,490 | B1 | | 9/2002 | Murphy |
| 6,547,484 | B2 | * | 4/2003 | Murphy ...................... 404/124 |
| 6,937,165 | B2 | * | 8/2005 | Rogers ....................... 340/963 |
| 7,032,436 | B2 | * | 4/2006 | Yokota et al. ................ 73/105 |

(Continued)

FOREIGN PATENT DOCUMENTS

| JP | 2006035928 A | * | 2/2006 |
| WO | WO 01/71372 A2 | | 9/2001 |

OTHER PUBLICATIONS

U.S. Appl. No. 11/094,323, filed Mar. 31, 2005, Kawazoe et al.

(Continued)

*Primary Examiner*—Carol S. W. Tsai
(74) *Attorney, Agent, or Firm*—Foley & Lardner LLP

(57) ABSTRACT

There are basically two types of rumble strips: shoulder/center rumble strips and in-lane rumble strips. In an embodiment of the invention, there is a device that automatically identifies the type of rumble strip with which a vehicle tire is in contact with. The device may include a processor adapted to receive input indicative of a state of rotation of a first vehicle tire and input indicative of a state of rotation of a second vehicle tire when one or more of the first vehicle tire and the second vehicle tire is in contact with a rumble strip. The processor includes logic to compare the state of rotation of the first vehicle tire to the state of rotation of the second vehicle tire, and determine from the comparison, the type of rumble strip in contact with at least one of the first vehicle tire and the second vehicle tire.

26 Claims, 11 Drawing Sheets

U.S. PATENT DOCUMENTS

2003/0194271 A1* 10/2003 Solon .......................... 404/15
2004/0144173 A1*  7/2004 Umeno et al. ................ 73/325
2004/0253053 A1* 12/2004 Wang et al. .................. 404/71
2005/0125153 A1*  6/2005 Matsumoto et al. ........ 701/300
2005/0212666 A1*  9/2005 Kawazoe et al. ........... 340/436
2005/0236210 A1* 10/2005 Kawazoe et al. ........... 180/272
2006/0006991 A1*  1/2006 Tyndall et al. .............. 340/442

OTHER PUBLICATIONS

U.S. Appl. No. 10/811,148, filed Mar. 29, 2004, Kawazoe et al.
U.S. Appl. No. 10/811,149, filed Mar. 29, 2004, Kawazoe et al.

* cited by examiner

RUMBLE STRIP RESPONSIVE SYSTEMS: DISCRIMINATION OF TYPES OF RUMBLE STRIPS

CROSS-REFERENCE TO RELATED PATENT APPLICATIONS

This patent specification is related to U.S. patent application Ser. Nos. 10/811,148 and 10/811,149, filed on Mar. 29, 2004, both to the present inventors and both entitled Rumble Strip Responsive Systems, the contents of which are incorporated herein in their entirety.

BACKGROUND OF THE INVENTION

Rumble strips are increasingly common on roadways. There are two major types of rumble strips: (1) shoulder/center rumble strips that are relatively narrow, that line sides of roads and/or are located in-between driving lanes of a road, and (2) in-lane rumble strips, which span about an entire lane of a road, or more. Shoulder/center rumble strips are typically used to provide warning to a driver that he or she is driving outside of a lane and/or off of a road, while in-lane rumble strips are typically used to provide a driver with a warning that he or she should reduce speed and/or that he or she is entering a geographic location that requires heightened driver caution.

Typically only tires on one side of the vehicle will contact shoulder/center rumble strips, while all tires of a vehicle typically contact in-lane rumble strips (the forward tires contacting the in-lane rumble strips first).

SUMMARY OF THE INVENTION

A device adapted to automatically identify a type of rumble strip, including a processor adapted to receive at least a first signal indicative of at least a state of rotation of a first vehicle tire and second signal indicative of a state of rotation of a second vehicle tire, wherein at least one of the first vehicle tire and the second vehicle tire is in contact with a rumble strip, wherein the processor includes logic to compare the state of rotation of the first vehicle tire to the state of rotation of the second vehicle tire and determine from the comparison a type of rumble strip in contact with at least one of the first vehicle tire and the second vehicle tire.

In another embodiment of the invention, there is a device adapted to automatically identify a type of rumble strip, comprising a processor adapted to receive at least a first signal indicative of a rotation speed of the first vehicle tire and second signal indicative of a rotation speed of a second vehicle tire, wherein at least one of the first vehicle tire and the second vehicle tire is in contact with a rumble strip. In this embodiment, the processor includes logic to (A) determine whether at least one of the first vehicle tire and the second vehicle tire is in contact with a rumble strip based on at least one of (i) the first signal, (ii) the second signal, and (iii) additional input (B) identify a substantial number of first values corresponding to rotation speeds of the first vehicle tire and identify a substantial number of second values corresponding to rotation speeds of the second vehicle tire substantially respectively corresponding temporally to the plurality of first values, (C) identify a first pattern of first values over a predetermined period of time and identify a second pattern of second values temporally respective to the first values over the predetermined period of time, and (D) determine whether the first pattern is substantially similar to the second pattern, and if a determination is made that at least one of the first vehicle tire and the second vehicle tire is in contact with a rumble strip and if a determination is made that the first pattern is substantially similar to the second pattern, output a signal indicative of a determination that at least one of the first and second vehicle tires are in contact with in-lane rumble strips.

In yet another embodiment of the invention, there is a device adapted to automatically identify a type of rumble strip, comprising, a processor adapted to receive at least a first signal indicative of a rotation speed of a first vehicle tire and a second signal indicative of a rotation speed of a second vehicle tire, and to receive input indicative of whether at least one of the first vehicle tire and the second vehicle tire is in free-wheel mode or in driven mode, wherein at least one of the first vehicle tire and the second vehicle tire is in contact with a rumble strip. In this embodiment, the processor includes logic to (A) identify a substantial number of first values corresponding to rotation speeds of the first vehicle tire and identify a substantial number of second values corresponding to rotation speeds of the second vehicle tire substantially respectively corresponding temporally to the plurality of first values, (B) identify a substantial number of third values which are equivalent to adding first values and respective second values, (C) determine whether a substantial number of third values fall outside a predetermined threshold range, (D) if a substantial number of third values fall outside the predetermined range, and if input has been received indicative of at least one of the first vehicle tire and the second vehicle tire are in a driven mode, output a signal indicative of a determination that at least one of the first and second vehicle tires are in contact with in-lane rumble strips and (E) if a substantial number of third values fall inside the predetermined range, and if input has been received indicative of at least one of the first vehicle tire and the second vehicle tire are in a driven mode, output a signal indicative of a determination that at least one of the first and second vehicle tires are in contact with shoulder/center rumble strips.

DETAILED DESCRIPTION OF THE PREFERRED EMBODIMENTS

The present inventors have determined that a computer/processor and/or other type of automated machine on-board a vehicle may be configured to automatically determine the type of rumble strip in contact with one or more tires of the vehicle and/or to automatically determine the location of the rumble strip with respect to the vehicle, based on the rotational speeds of one or more vehicle tires. From the automatic determination of the type of rumble strip in contact with vehicle tire(s), a computer/processor may then make an automatic determination as to whether a vehicle is heading off a road/lane (e.g., contact with a shoulder/center rumble strip) and/or if a vehicle is heading towards an area requiring heightened driver caution (e.g., contact with an in-lane rumble strip), etc. That is, if the type of rumble strip in contact with the vehicle tire(s) may be automatically determined, collision control/avoidance, collision warning systems and/or lane departure control/warning systems on-board the vehicle may be more accurately/expediently utilized, thus reducing the chances of collision and/or the chances of road departure.

Figure 1:
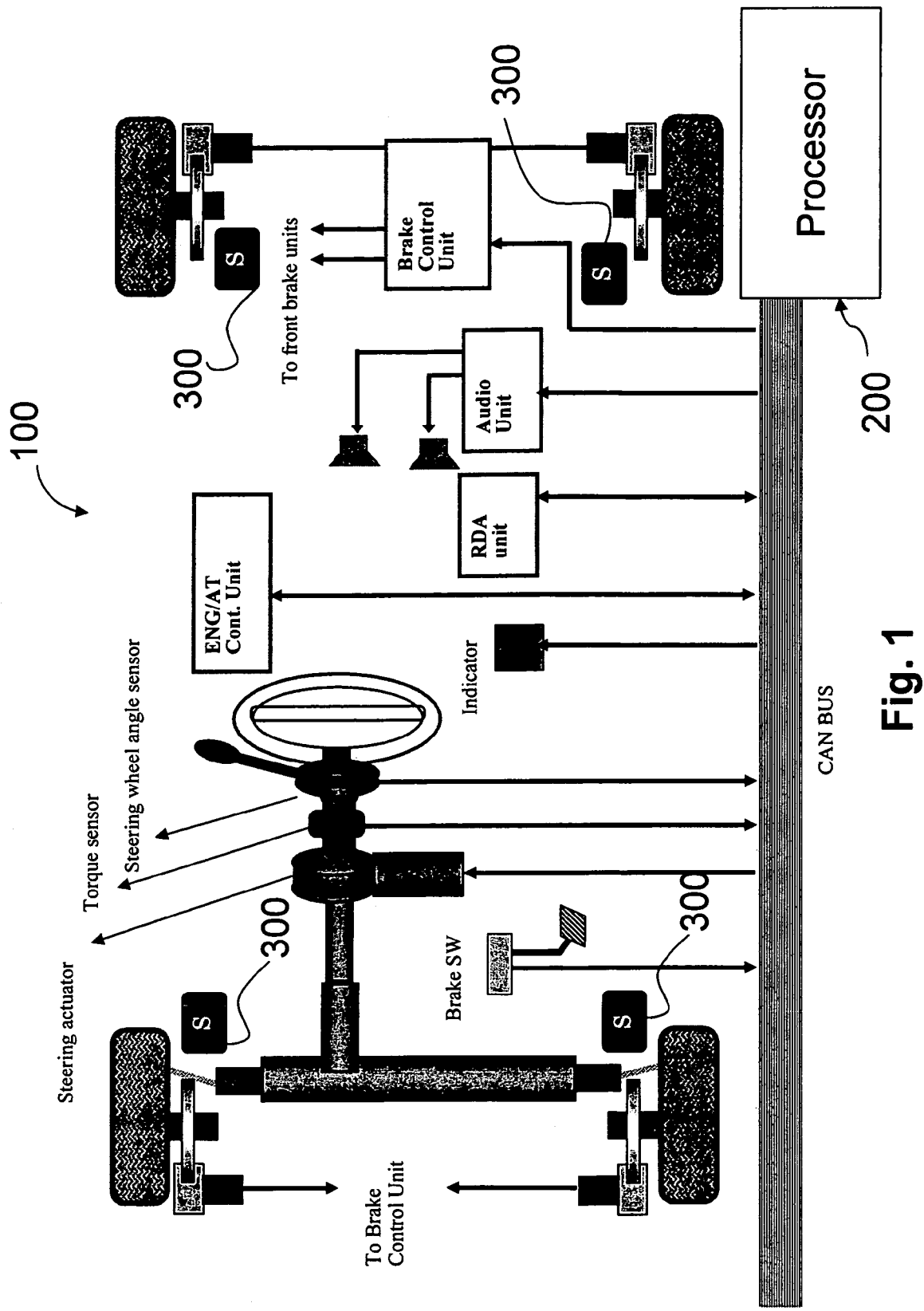
FIG. 1 is a schematic representation of a vehicle equipped with a device according to an embodiment of the present invention.

FIG. 1 schematically presents a first embodiment of the present invention. As may be seen from FIG. 1, there is a vehicle 100 equipped with a device including a processor 200 that is adapted to automatically identify a type of rumble strip in contact with a tire of a vehicle. According to a first embodiment of the invention, the processor 200 receives input through a CAN BUS from sensors 300 indicative of a state of rotation of a first vehicle tire, such as, for example a right front vehicle tire, and input indicative of the state of rotation of a second vehicle tire, such as, for example, a left front vehicle tire, when one or both of these tires is/are in contact with a rumble strip. The device compares the states of rotation of the two tires, and, at least from the comparison, determines the type of rumble strip in contact with one or both of the tires. In a first embodiment of the present invention, the device determines whether the rumble strip in contact with the tire(s) is (i) a shoulder/center rumble strip or (ii) an in-lane rumble strip. An exemplary scenario utilizing the first embodiment of the present invention will initially be described, followed by descriptions of some of the specific embodiments of the present invention.

Before describing the exemplary scenario, it is noted that FIG. 1 further presents a vehicle 100 equipped with various components utilized in collision control/avoidance/warning systems, as well as lane departure control/avoidance/warning systems. Some embodiments of the invention utilize some or all of these components in combination with a device to determine the type of rumble strip in contact with vehicle tire(s). However, it is noted that some or all of these other components are not necessary to practice other embodiments of the present invention.

Figure 2:
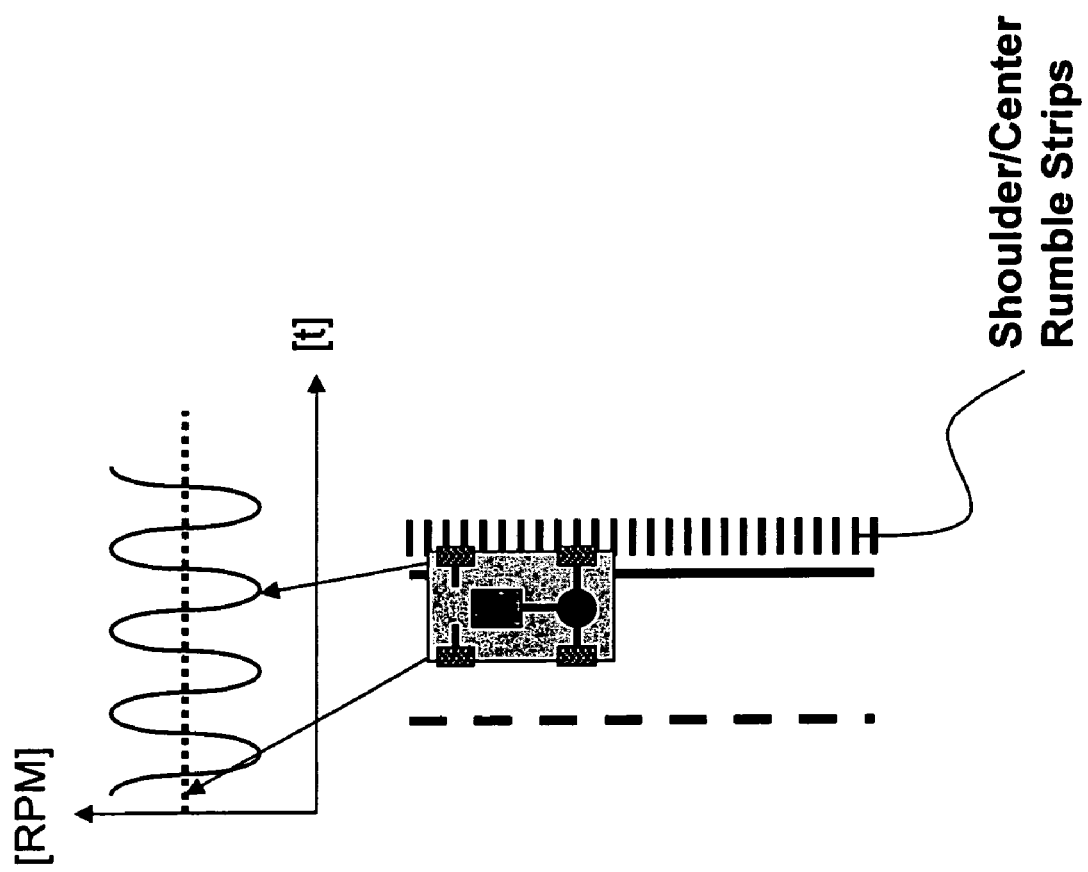
FIG. 2 is a schematic representation of rotational speeds of free-wheeling vehicle tires in contact and not in contact with a shoulder/center rumble strip.

In a first exemplary scenario, a rear-wheel drive vehicle equipped with the device according to the present invention travels down a road and encounters a rumble strip, (i.e., one or more of the vehicle tires come into contact with a rumble strip), as is exemplary depicted in FIG. 2. A device according to the first embodiment on-board the vehicle detects contact with the rumble strip and makes a determination that one or more of the vehicle tires is in contact with a rumble strip. In this scenario, a determination is made that the front right tire, which is a free-wheeling tire, is in contact with the rumble strip.

The rotational speed of the free-wheeling tire, the right front tire, in contact with the rumble strip varies as the vehicle travels down the road and continues to contact the rumble strip, due to, for example, alternate contact with the grooves of the rumble strip. Conversely, the free-wheeling vehicle tire(s) that do not come into contact with the rumble strip (e.g., the front left tire) has a substantially constant rotational speed. The device according to the first embodiment on-board the vehicle receives a signal indicative of the rotational speed of the front left tire and receives a signal indicative of a rotational speed of the front right tire. The device compares the information carried on the two signals and "looks" for a difference in the rotational speed of the right tire as compared to that of the left tire. For example, if the front right tire is in contact with (riding on) a shoulder/center rumble strip, and the front left tire is not in contact with a rumble strip (i.e., the tire is riding on a normal road surface), the rotational speed of the front right tire in contact with the rumble strip will fluctuate in a sinusoidal oscillatory manner, while the rotational speed of the front left tire remains substantially constant.

Figure 3:
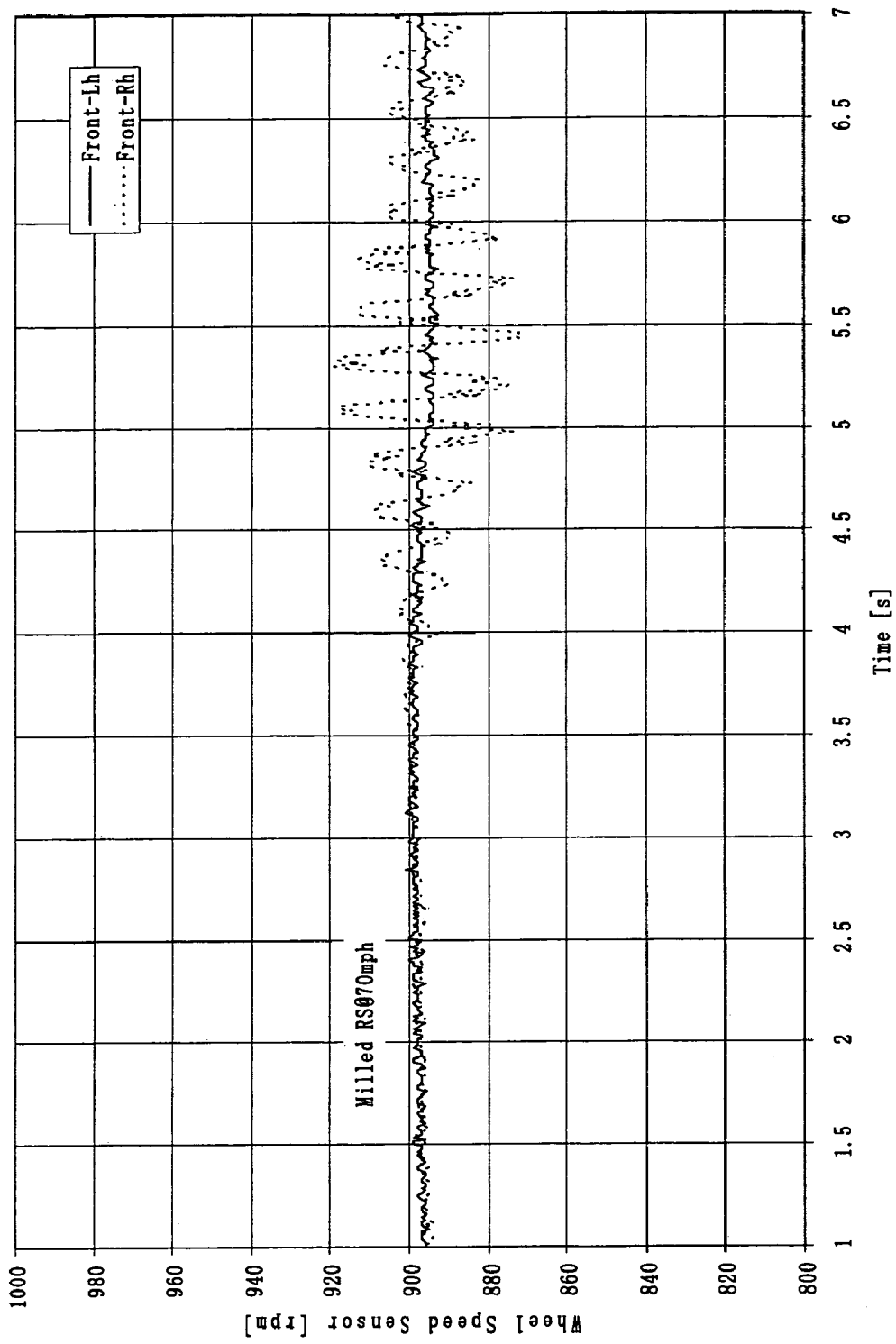
FIG. 3 presents empirical data from a two-wheel drive vehicle having tire(s) on one side of the vehicle in contact with a rumble strip, and having tire(s) on the other side of the vehicle not in contact with a rumble strip.

FIG. 2 shows a schematic representation of a vehicle having right side tires in contact with a shoulder/center rumble strip and left side tires on a normal road surface. FIG. 2 also shows a schematic representation of an output of a rotational speed sensor of the front right tire and the front left tire over a period of elapsed time of rumble strip contact. In the device according to the first embodiment of the invention, as used in the present scenario, from the output indicative of the rotational speeds of the two tires, the device compares the two rotational speeds during the period of time or portion of the period of time of rumble strip contact to determine that there is a difference in the rotational speeds and thus determine the type of rumble strip in contact with the vehicle tire. FIG. 3 presents empirical data from a two wheel drive vehicle having tire(s) on one side of the vehicle in contact with a rumble strip, and having tire(s) on the other side of the vehicle not in contact with a rumble strip.

Figure 4:
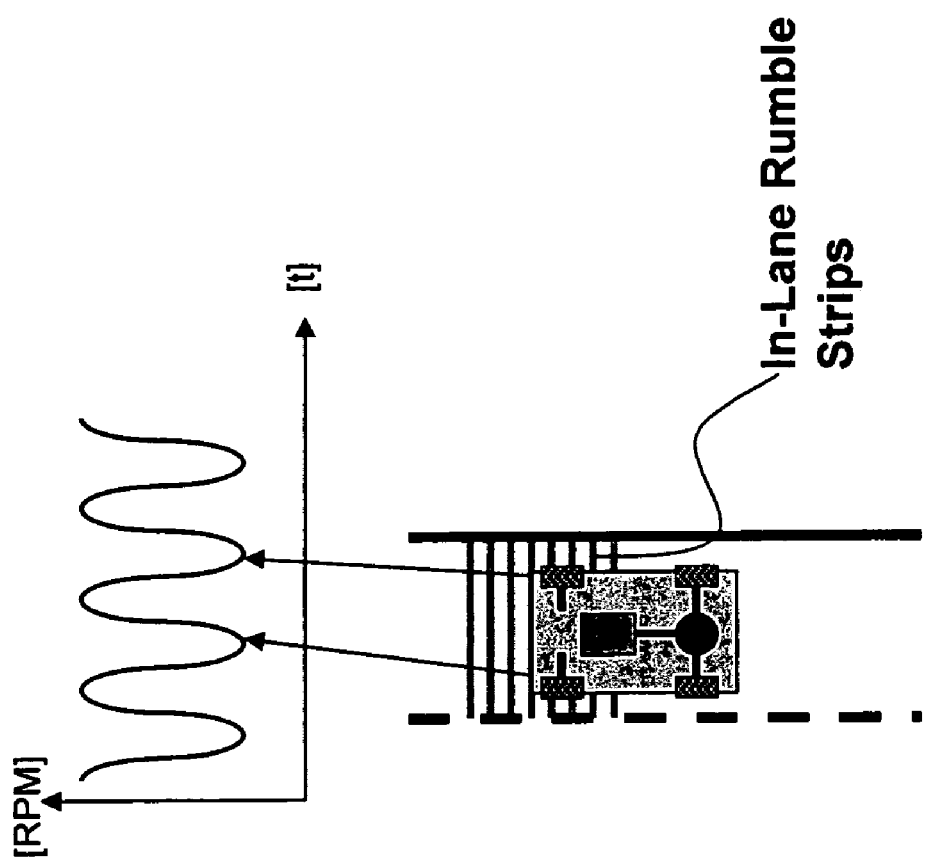
FIG. 4 is a schematic representation of rotational speeds of free-wheeling vehicle tires in contact with an in-lane rumble strip.

Further by exemplary scenario, if the vehicle encounters in-lane rumble strips, such as shown in FIG. 4, both the left and the right front vehicle tires will come into contact with the rumble strips. FIG. 4 schematically depicts an output of a rotational speed sensor over a period of time of tire contact with rumble strips from the front left tire and the front right tire. As may be seen, the rotational speeds of both tires will vary in a manner that is the same as each other because both tires are striking the rumble strips at about the same time and experience substantially the same effects at the same time. Thus, even though the rotational speeds of both tires fluctuate during the period of time, the fluctuation will be substantially similar. Thus, in a vehicle with a device according to the first embodiment, if the device determines that at least one vehicle tire is in contact with the rumble strip and the output from rotational speed sensors of parallel tires (e.g., front tires) is about the same, the device will determine that the vehicle is encountering in-lane rumble strips.

It is noted that in the just described scenario, the vehicle is a rear-wheel drive vehicle, and the front left and front right tires are free-wheeling tires. That is, there is no direct driving torque applied to the front tires from the vehicle engine, and thus they free-wheel. Alternatively, if the vehicle was a front-wheel drive vehicle, the rear wheels would free-wheel, and thus the rotational speeds of the free-wheeling wheels shown in FIGS. 2 and 3 would be that for the rear left and right wheels. (Note by front-wheel drive and rear-wheel drive, it is also meant vehicles capable of all-wheel drive and four-wheel drive operating in two-wheel drive mode.)

In this regard, in an exemplary scenario where the vehicle is a front-wheel drive vehicle, the rear left and rear right tires will be free-wheeling. Thus, an embodiment utilizes the rotational speeds of the rear tires to identify rumble strip type. However, it is noted that in some embodiments, it is desirable to identify contact with a rumble strip as soon as possible. Thus, in the case of a front-wheel drive vehicle, some embodiments may have sensors on the front wheels that detect contact with rumble strips, since it is likely that the front wheels will contact rumble strips before rear wheels.

Figure 5:
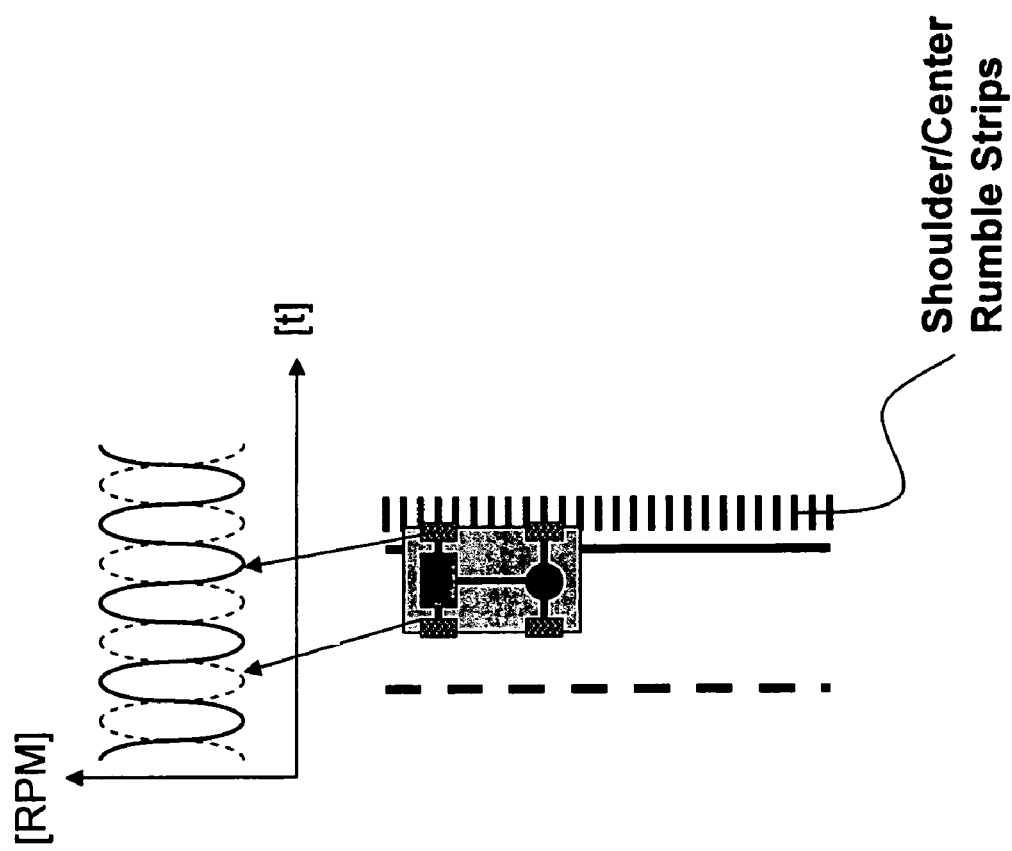
FIG. 5 is a schematic representation of rotational speeds of driven vehicle tires in contact and not in contact with a shoulder/center rumble strip.
Figure 6:
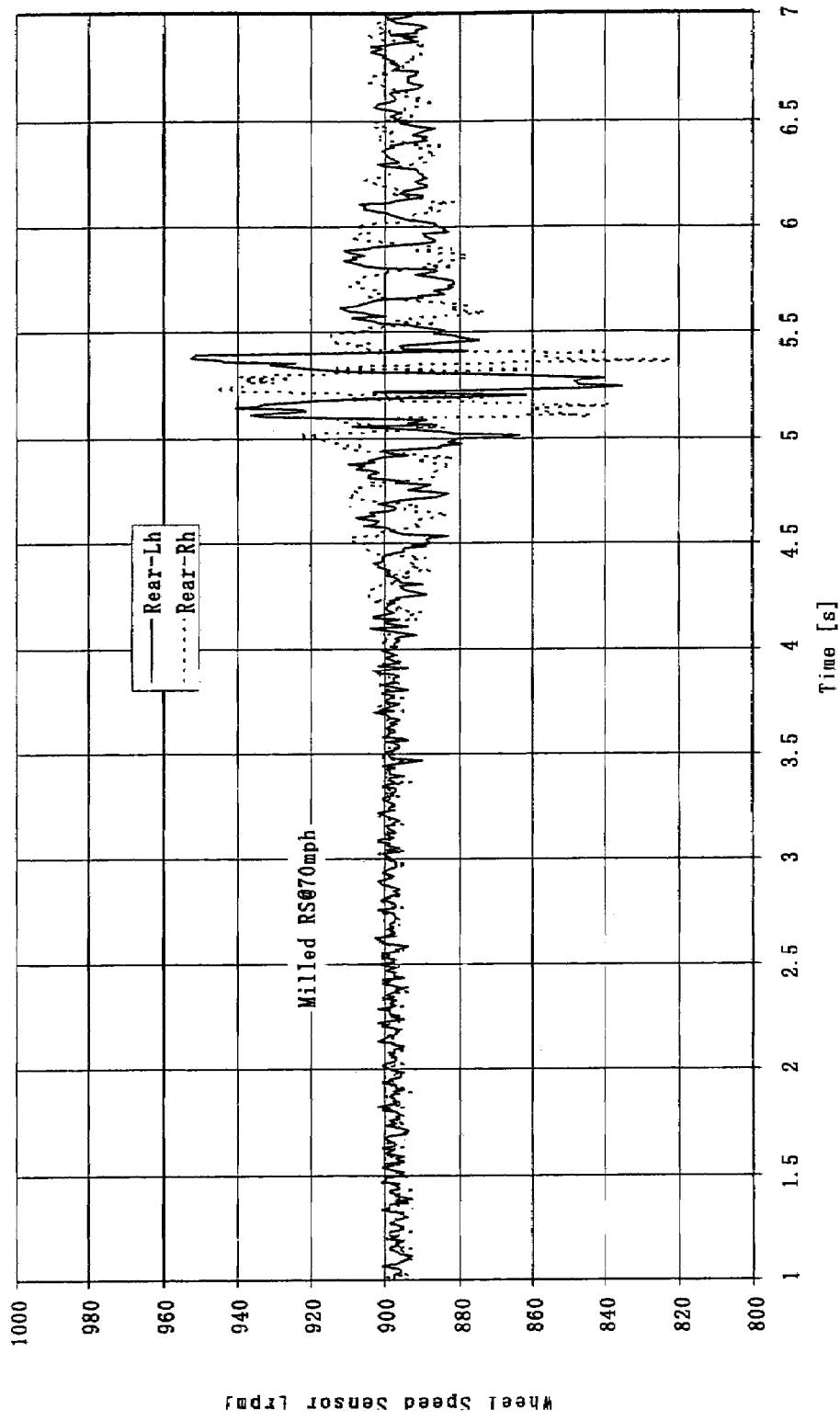
FIG. 6 presents empirical data from a four-wheel drive vehicle or an all-wheel drive vehicle having tire(s) on one side of the vehicle in contact with a rumble strip, and having tire(s) on the other side of the vehicle not in contact with a rumble strip.

For all-wheel drive and/or four-wheel drive vehicles, the rotational speeds of the tires not in contact with rumble strips may be different from that experienced similarly situated free-wheeling tires depicted in FIGS. 2 and 3 because all of the wheels are drive wheels. FIG. 5 presents a scenario where the front right and/or rear right tires of an all-wheel drive vehicle or a four-wheel drive vehicle are in contact with a shoulder/center rumble strip and the front left and rear left tires are not in contact with a rumble strip. FIG. 5 shows the output of a rotational speed sensor for the front right tire and the front left tire, respectively. It is noted that the schematic representation of the rotational speeds of the front left and front right tires shown in FIG. 5 could be that of the rear left and rear right tires as well for an all-wheel drive and/or a four-wheel drive vehicle. FIG. 6 presents data from a four-wheel drive vehicle or an all-wheel drive vehicle having tire(s) on one side of the vehicle in contact with a rumble strip, and having tire(s) on the other side of the vehicle not in contact with a rumble strip.

Figure 7:
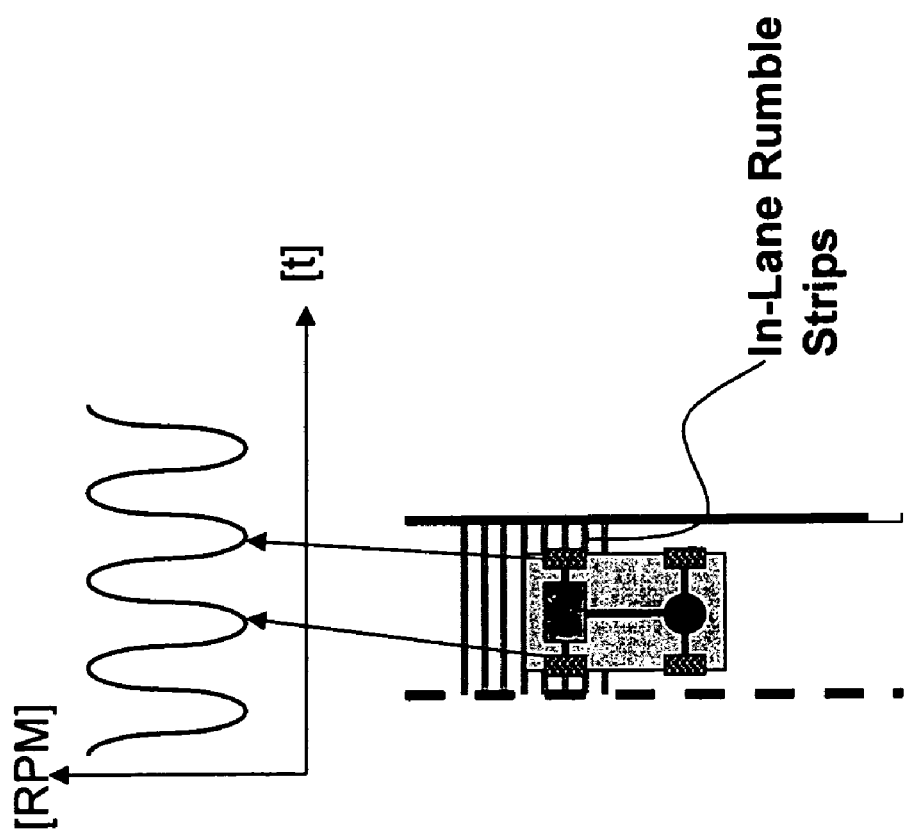
FIG. 7 is a schematic representation of rotational speeds of driven vehicle tires in contact with an in-lane rumble strip.

FIG. 7 presents an exemplary scenario where an all-wheel drive and/or four-wheel drive vehicle is in contact with in-lane rumble strips. As may be seen from the schematic representation of the output of the rotational speed sensors for the front left and front right tires, the rotational speeds of the tires are substantially about the same. That is, the speeds vary over a given time period in a manner substantially similar to one another (i.e., rotational speed values at respective times are substantially similar to one another). Thus, it may seen that for vehicle tire contact with in-lane rumble strips, the rotational speeds of the tires in contact with the rumble strip would be substantially the same at given times over a period of time of contact with a rumble strip regardless of whether the vehicle is in four-wheel drive mode, all-wheel drive mode or two-wheel drive mode. Therefore, in the exemplary scenarios just described, when vehicle tires are in contact with in-lane rumble strips, the rotational speeds of respective front left and right tires and/or respective rear left and right tires will vary in a manner substantially similar to each other. Conversely, when vehicle tires on only one side of the vehicle come into contact with a rumble strip, such as in the situation of contact with a shoulder/center rumble strip, the rotational speeds of the tires in contact with the rumble strip will be different than that of the wheels not in contact with the rumble strip (or normal road) at given times. That is, when the output of FIG. 2 is compared to that of FIG. 5, it may be seen that the rotational speeds of the tire not in contact with the rumble strip will be different depending on whether the vehicle is an all-wheel drive, a four-wheel drive, or a two-wheel drive vehicle.

Accordingly, a first embodiment of the present invention may be utilized in one or more of the scenarios described above to compare rotational speeds of various vehicle tires to determine the type of rumble strip encountered by the vehicle and/or the location of the rumble strip encountered by the vehicle. Such an embodiment may include a device with a processor that is adapted to receive a first signal indicative of a state of rotation of a first vehicle tire and a second signal that is indicative of a state of rotation of a second vehicle tire, wherein at least one of these tires is in contact with a rumble strip. The processor in this device may include logic to compare the state of rotation of the first vehicle tire to the state of rotation of the second vehicle tire, and determine from this comparison the type of rumble strip that is in contact with one or more of the vehicle tires.

By "state of rotation," it is meant both the rotational speed of a vehicle tire and/or a change in the rotational speed of the vehicle tire. By way of example, in the scenario of FIG. 2, where the right front free-wheeling tire is in contact with a shoulder/center rumble strip and the left front free-wheeling tire is not in contact with the shoulder/center rumble strip, the rotational speed of the right front vehicle tire changes in a sinusoidal oscillatory pattern, while that of the left tire remains substantially constant as time progresses. Thus, over a given period of time, the rotational speed of the right front vehicle tire changes and has a rate of change of speed that may be mathematically described as the slope of tangent of the oscillatory pattern of FIG. 2. Conversely, the rotational speed of the left-front tire does not substantially change, and thus the slope of the tangent of that output will be zero or about zero.

In an embodiment of the present invention that compares the rotational speed of the first vehicle tire to that of the parallel second vehicle tire, the processor may include logic to identify a plurality of first values that correspond to rotational speeds of the first vehicle tire (e.g., right front tire) at different times over the period of rumble strip contact or a portion of the period of rumble strip contact and identify a plurality of second values that correspond to rotational speeds of the second vehicle tire (e.g., left front tire) at different times of the same period, where the first values and second values substantially respectively correspond temporally to each other. By way of example, the processor could tag one of the first value with a time $T_1$ and tag one of the second values also with a time $T_1$. These values would thus be compared to each other, as opposed to, for example, comparing the first value tagged $T_1$ to a second value tagged $T_2$, where $T_2$ is a time about 0.25 seconds after $T_1$. Alternatively, in another embodiment, one of the first values may be tagged $T_1$ and one of the second values may be tagged $T_2$, and the processor may analyze the respective time values for $T_1$ and $T_2$, and determine that the time values are sufficiently close in temporal proximity to one another to substantially consider the first value and the second value to be indicative of rotational speeds of respective tires at substantially the same time. For example, if $T_1$ is +2.357 seconds and $T_2$ is +2.355 seconds, the processor would consider the tagged first value and the tagged second value to be obtained at the same time/substantially at the same time, and thus consider these values to be in substantially temporal correspondence with one-another. The device according to this embodiment may compare a substantial number of first values to respective temporally corresponding second values, and from this comparison, determine whether a substantial number of first values and respective second values are substantially different from each other. If such a determination is made, the processor may then determine that the rumble strip is a shoulder/center rumble strip. In the device just described, the processor may also include logic such that if a comparison of a substantial number of first values to temporally respective second values results in a determination that a substantial number of respective first and second values are substantially similar to each other, the device may determine that the rumble strip in contact with the vehicle tires is an in-lane rumble strip if the processor includes such logic.

Alternatively or in addition to the features of the device detailed above, the device of the first embodiment may include logic to compare the rate of change in rotation speeds (acceleration) of the first vehicle tire to that of the second vehicle tire. In such an embodiment, the processor may include logic to identify a plurality of third values corresponding to rate of changes of rotation speeds of the first vehicle tire (i.e., front right tire) and identify a plurality of fourth values corresponding to rate of changes of rotation speeds of the second vehicle tire (e.g., left front tire) where these third and fourth values substantially respectively correspond in a temporal manner to each other. If, from the comparison, the processor determines that the rate of change in rotational speeds of the respective tires is about the same, as temporally analyzed, the processor may determine that the vehicle is driving on an in-lane rumble strip. Conversely, if the rate of change in rotational speeds of the respective tires are substantially different from one another, as temporally analyzed, the processor will determine that the vehicle is driving on shoulder/center rumble strips.

It is noted that the comparison of rotational speeds/ accelerations may be accomplished in a variety of ways. Thus, the present invention includes any device, system, or method that will enable a processor to obtain sufficient information indicative of the rotational state of one or more tires, where sufficient information means enough information to enable an automated device, such as a processor, to determine at least the type of rumble strip with which one or more vehicle tires is in contact. Indeed, the present invention may be practiced with estimated tire rotational speeds/ accelerations, provided that the estimates permit a determination as to the type of rumble strip to be made.

In one or more of the just described embodiments, the processor may also be adapted to output a signal indicative of the determination of the type of rumble strip that is in contact with one or more of the vehicle tires. Such a signal may be utilized in a road departure warning/control device/ system/method as described in co-pending U.S. patent application Ser. Nos. 10/811,148 and 10/811,149, filed on Mar. 29, 2004, both to the present inventors and both entitled Rumble Strip Responsive Systems, the contents of which are incorporated herein by reference in their entirety. Still further, it is noted that the present invention may be combined in an overall system/device that includes the teachings of the just mentioned applications.

It may be understood from FIGS. 2 and 4 that there will be brief instances over a period of contact with a shoulder/ center rumble strip where the rotational speeds of the left tire will be the same as that of the right tire, even though only one of those tires is in contact with the rumble strip. For example, in FIG. 2, where the rotational speed of the left tire is constant during the period of rumble strip contact, the sinusoidal oscillating rotational speed of the right tire will have values during the period of contact that are about equal to or equal to the rotational speed of the left tire on at least two occasions during a cycle, even though only one of the tires is in contact with the rumble strip. These values may have the same effect as a "false readings," although in this instance, they are more accurately considered "frustrating readings," readings that tend to frustrate a simple logic algorithm. Thus, an embodiment of the present invention includes a device that is configured such that a substantial number of the first values and second values indicative of rotational speeds of vehicle tires during a period of rumble strip contact will not be cycle-coincident values. By cycle-coincident values, it is meant values such as those depicted in FIG. 2 and FIG. 5, where the sinusoidal oscillating cycle of the rotational speed of the tire in contact with a rumble strip is about the same as the speed of other tire at certain temporal locations (see, e.g., where the two patterns intersect). By way of example only and not by way of limitation, the processor may include logic to differentiate such values from other values. Still further by way of example, output of a rotational speed sensor may be timed or otherwise controlled such that cycle-coincident values are not sent to the processor. Thus, any device, method or system that may be utilized to ensure that the processor does not obtain a substantial number of cycle-coincident values, that would effectively result in "false readings" and/or "frustrating readings" may be used to practice the invention.

As may be seen from FIGS. 2 and 4, the rotational speed of a vehicle tire not in contact with a rumble strip may be different depending on whether or not the vehicle tire is a free-wheeling tire or a driven tire. As may be seen, if the tire not in contact with a rumble strip is a free-wheeling tire, as in FIG. 2, the rotational speed of that tire will not substantially change during the period of rumble strip contact. Alternatively, if that tire is a driven tire, the rotational speed of that tire may change during the period of rumble strip contact, even though that tire does not contact a rumble strip. In particular, the tire not in contact with a rumble strip of a vehicle in four-wheel drive mode or all-wheel drive mode may change rotational speeds in a sinusoidal pattern that is about 180° out of phase with that of the tire in contact with rumble strips. Thus, in some embodiments of the present invention, there is a device that is adapted to receive input indicative of whether the first and/or second tires are in a free-wheeling state and/or whether the tires are in a driven state. The processor of such a device may receive this first input and then analyze second input received indicative of the rotational speeds of the vehicle tires, in a different manner, depending on whether the tires are driven tires or free-wheeling tires. By way of example only and not by way of limitation, if the processor receives input that the vehicle tires are in a driven mode (i.e., torque is being applied from the engine to all of the tires), the processor will "look" for a phase difference of the rotational speed pattern of the first and second tires, where at least one of the tires is in contact with a rumble strip. For example, in reference to FIGS. 4 and 5, the processor may identify a pattern of rotational speed change of the tires (e.g., a sinusoidal oscillating pattern), and compare the speed patterns of the respective tires to each other. If the patterns substantially coincide, such as shown in FIG. 7, the processor may determine that the vehicle tires are in contact with in-lane rumble strips. Alternatively, if the processor determines that the patterns do not coincide in general, and more specifically, if the processor determines that the patterns are about 180° out of phase with each other, the processor may determine that the tire(s) are on a shoulder/center rumble strip.

It is noted that some of the embodiments of the present invention will first make a determination of whether a vehicle tire (regardless of which tire) is in contact with a rumble strip before a determination is made of the type of rumble strip. In this regard, a separate rumble strip sensor may be utilized in the present invention. Such rumble strip sensors that may be used with the present invention include, but are not limited to, rumble strip sensors as disclosed in co-pending U.S. patent application Ser. Nos. 10/811,148 and 10/811,149, filed on Mar. 29, 2004, both to the present inventors and both entitled Rumble Strip Responsive Systems, the contents of which are incorporated herein by reference in their entirety. Embodiments of the present invention may simply utilize input indicative of rotational speeds of one or more of the vehicle tires to determine whether or not a vehicle tire is in contact with a rumble strip. Accordingly, an embodiment of the present invention includes a processor as described above, with logic to analyze one or more of the signals that are indicative of the rotational speeds of the first and/or second tires, and determine that at least one of the vehicle tires is in contact with the rumble strip if the rotational speed of a first and/or second tire varies in a pre-determined manner in general, and in an oscillatory manner in particular, over a time period.

In some embodiments, the time period selected to analyze rotational speeds may be selected such that engine RPM is substantially constant during that predetermined time period. Alternatively or in addition to this, the rotational speeds may first be analyzed and/or values for the rotational speeds over a time period may be obtained, and a check may be performed to verify that changes in rotational speeds of one or more tires are likely not attributable to a change in engine RPM. Indeed, other embodiments may be practiced with a device, system or method that checks to ensure that a change in vehicle rotation speed is likely only attributable to contact with rumble strips, and/or not likely attributable to a phenomenon other than contact with rumble strips. By way of example, FIGS. 2–5 show how rotational speed of a vehicle tire changes in an oscillatory manner when a vehicle tire comes into contact with a rumble strip. (As noted above, both vehicle tires may have rotational speeds that oscillate even though only one tire comes into contact with a rumble strip, in the case of all-wheel drive and/or four-wheel drive vehicles.) According to this embodiment, a period of time may be selected such that it is highly unlikely that other unrelated phenomenon(s) impart the oscillatory rotational-speed changes of the vehicle tires. Additionally, some embodiments may further reduce the chances that unrelated phenomenon(s) may cause the oscillatory rotational speed changes by selecting a predetermined time period based on the speed of the vehicle and/or known rumble strip groove spacings. Still further, empirical data may be used for comparison purposes. For example, empirical data relating to a change in rotational speed of a tire in contact with rumble strips of a given geometry for given vehicle speeds may be collected and stored in the processor or a memory device linked to the processor, and used to help analyze the signals indicative of rotational speed of the tires. Still further, since rumble strip geometry does sometimes vary (milled-in rumble strip, rolled rumble strips, etc.), the present invention may include a device, system, or method to analyze the geometry of the rumble strip and use this analysis to further aid in analyzing the rotational speeds of the tires.

Figure 8:
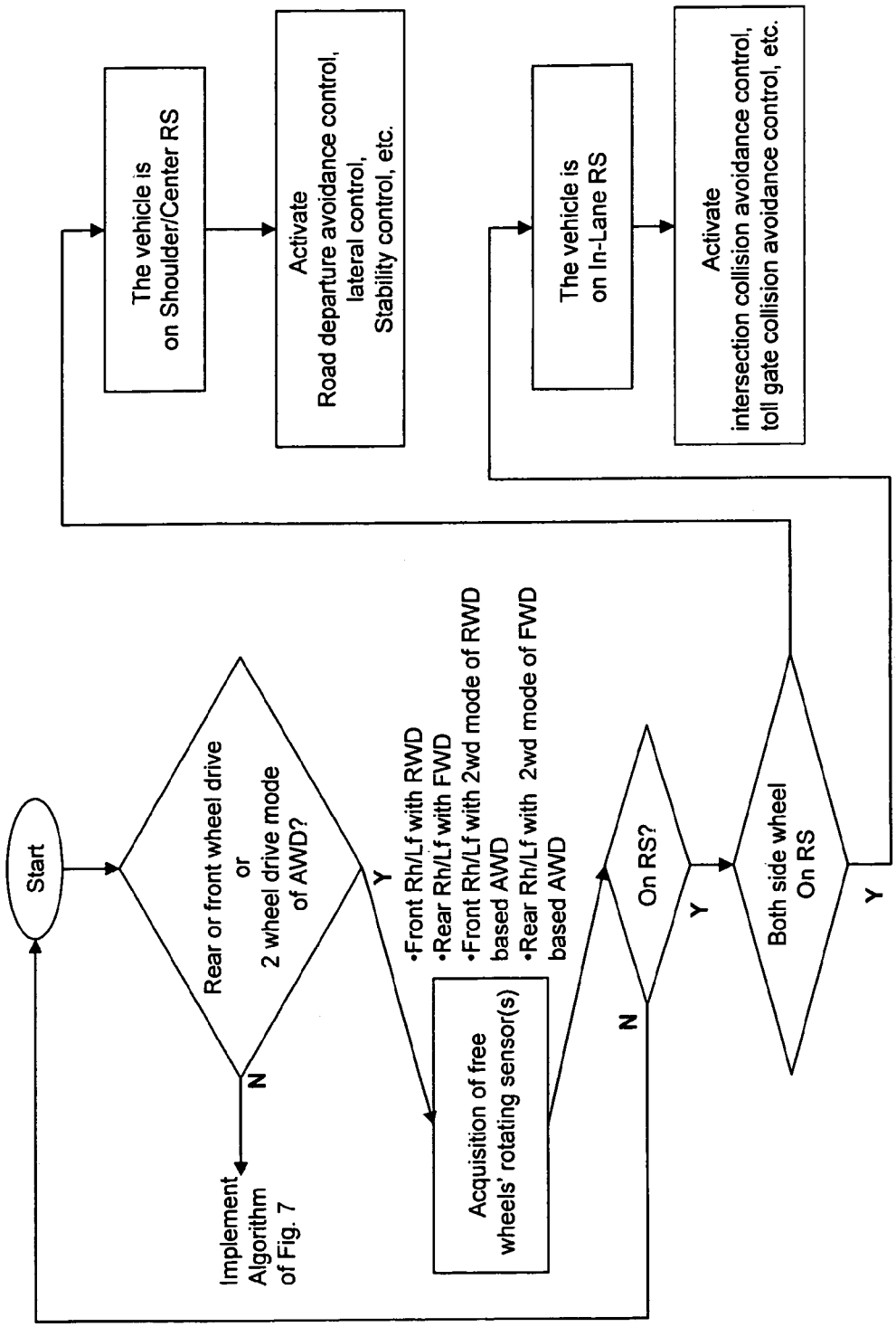
FIG. 8 presents an exemplary algorithm for implementing an embodiment of the present invention.

The present invention also includes algorithms which may be utilized to implement one or more embodiments of the present invention. In this regard FIGS. 6 and 7 present algorithms for vehicles that have free-wheeling tires and for vehicles in all-wheel drive/four wheel drive mode, respectively. These algorithms illustrate specific implementations of the invention. One of skill in the art will understand that these figures provide some examples of the techniques described in detail above. Because such techniques have been described in detail above and/or may readily be implemented by one of ordinary skill in the art based on the figures in combination with the teachings and knowledge in the art, an extensive detailed description of these figures is not provided. However, details of the algorithm of FIG. 9 will briefly be described, as there are many similarities between the algorithm of FIG. 8 and FIG. 9.

Figure 9:
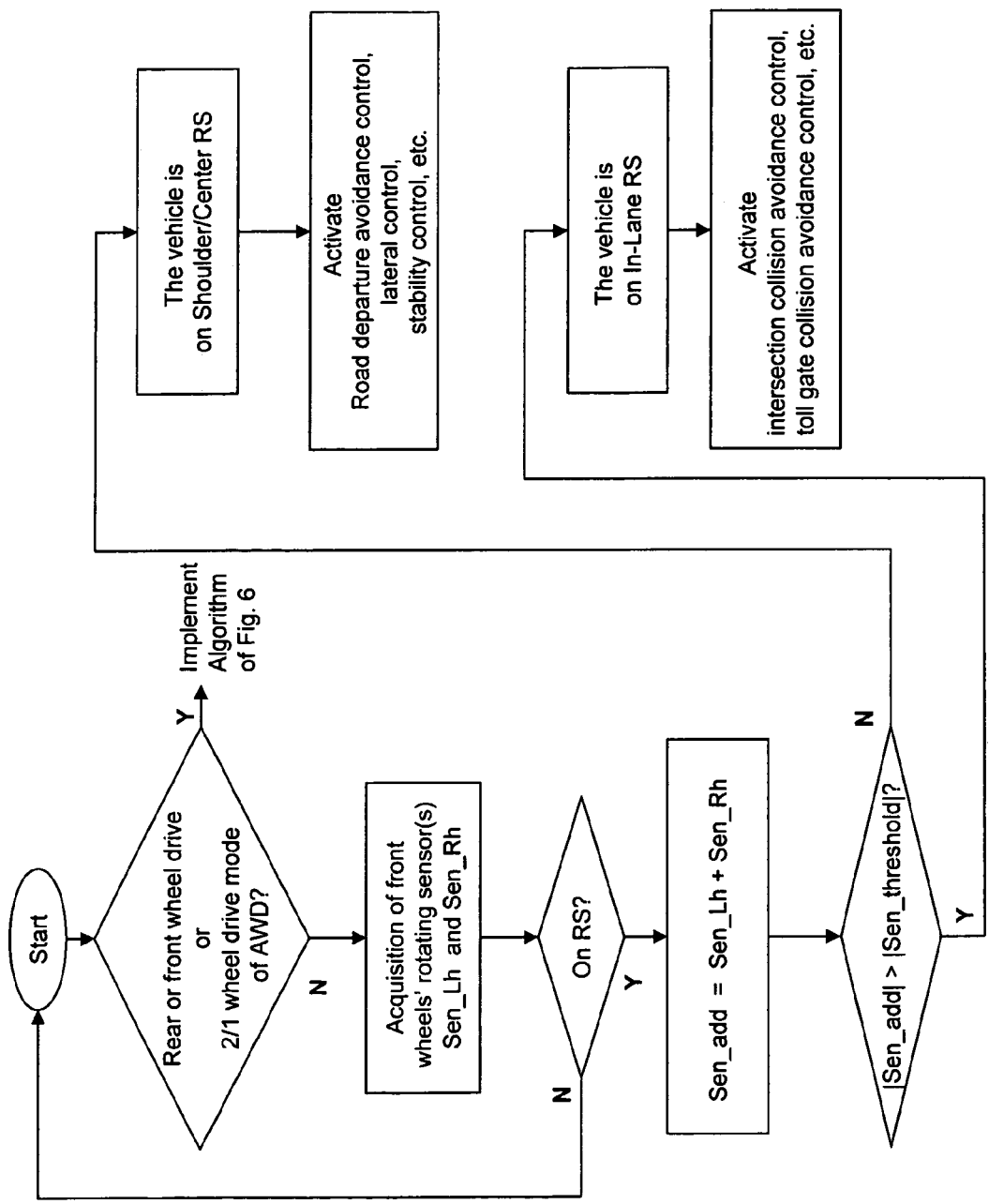
FIG. 9 presents another exemplary algorithm for implementing an embodiment of the present invention.
Figure 10:
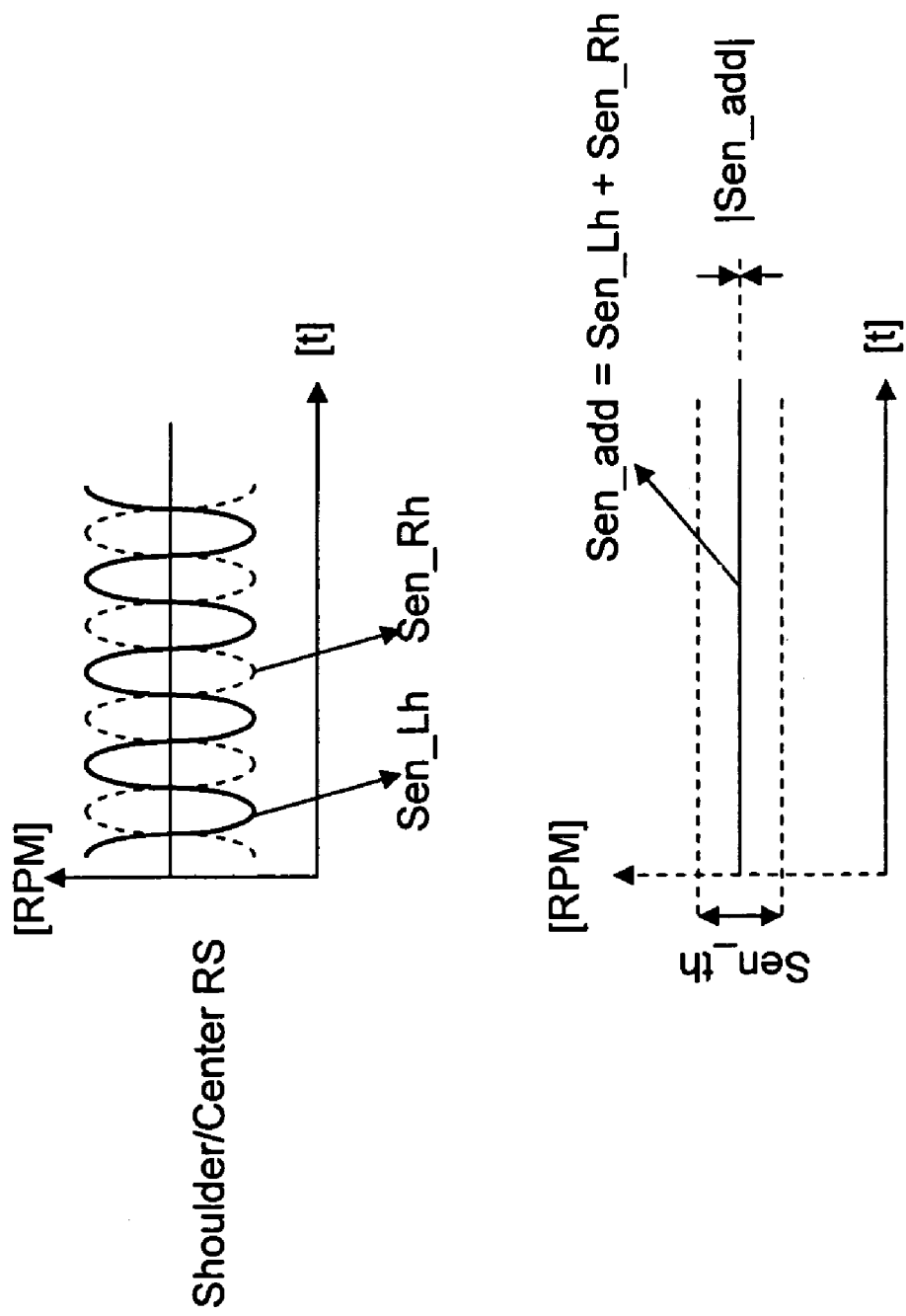
FIG. 10 presents a schematic representation of the mathematics behind the algorithm of FIG. 9 for a scenario in which a vehicle tire contacts a shoulder/center rumble strip.

According to the algorithm of FIG. 9, when the vehicle is in four-wheel drive mode and/or all-wheel drive mode, the processor first makes a determination whether or not a vehicle tire is in contact with a rumble strip. Upon a determination that a vehicle tire is in contact with a rumble strip, the rotational speeds of the front left tire at discrete intervals over a given time period, are determined, and the rotation speeds of the front right tire at discrete intervals over the same period of time, are also determined. These speeds are added to each other to obtain overall values for the combined speeds of the left front and right front tire for the discrete intervals. If the combined values of the rotational speeds of the left front tire and the right front tires at the discrete time intervals fall within a predetermined threshold range (where the threshold range may be, for example, dependent on vehicle speed), a determination will be made that a vehicle is driving on shoulder/center rumble strips. FIG. 10 schematically presents this phenomenon. In FIG. 10, it may be seen that the oscillatory pattern of the front right vehicle tire duplicates the pattern of the front left vehicle tire, except that the patterns are 180° out of phase, when the vehicle is driving on a shoulder/center rumble strip and thus only tires on one side of the vehicle are in contact with the rumble strip. If the values of the rotational speeds of the front right tire are added to those of the front left tire, the resulting values will be substantially constant, as shown in FIG. 10, and thus fall within the predetermined threshold range. (It is noted that this range may vary based on one or more factors, such as, for example, vehicle speed, etc.) This would be the case because the pattern of rotational speed change for a given period of time for the right front tire would be about 180° out of phase for that of the left front tire, thus adding the two values would result in a combined rotational speed that is substantially constant, and thus falls within a relatively narrow threshold range. (It is noted that in other embodiments of the present invention, the rotation speeds may be subtracted from each other, and with the proper logic, a determination may still be made as to whether the vehicle in on in-lane rumble strips or shoulder/center rumble strips.)

Figure 11:
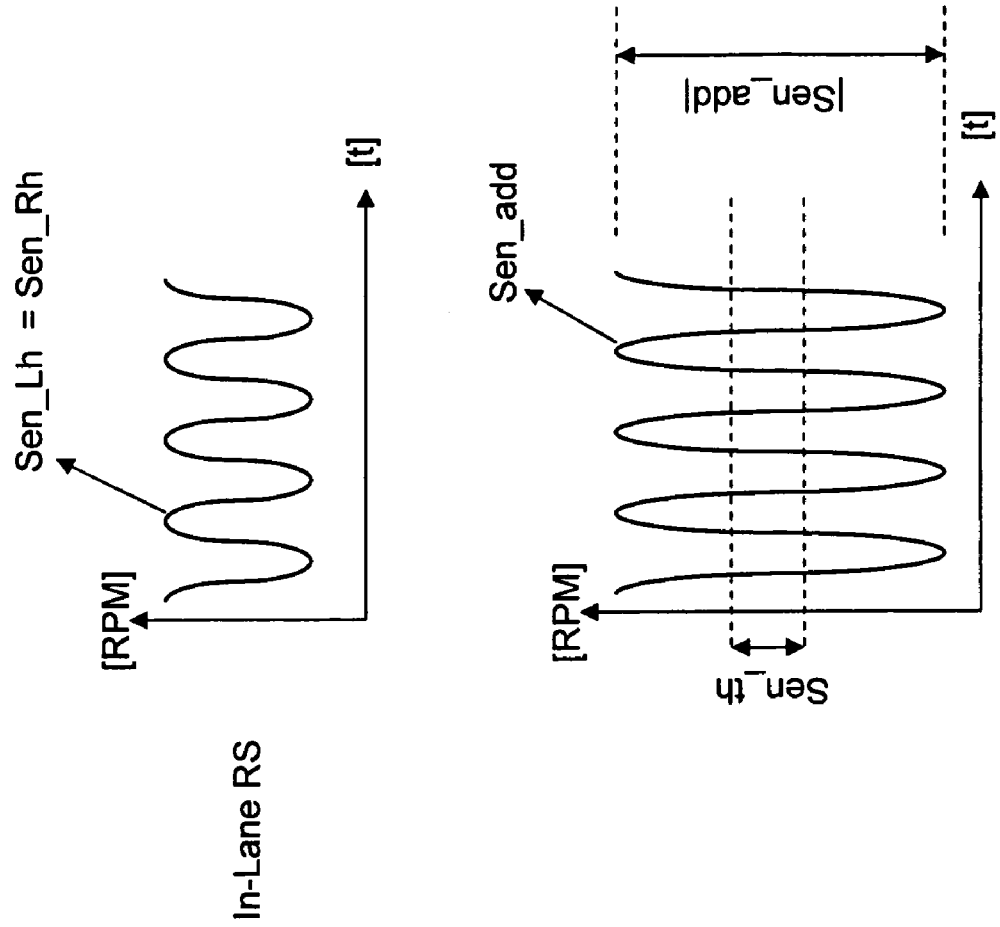
FIG. 11 presents a schematic representation of the mathematics behind the algorithm of FIG. 9 for a scenario in which a vehicle tire contacts an in-lane rumble strip.

Conversely, when the vehicle is driving on an in-lane rumble strip, in four-wheel drive mode or in all-wheel drive mode, the rotational speed of both the front right tire and the front left tire will be about the same as each other at discrete intervals over the time period, and the rotational speeds will change in about the same manner at about the same time. This is schematically illustrated in FIG. 11. As may be seen in FIG. 11, when the rotational speeds of the front left tire and the front right tire at discrete respective intervals are added together, over a period of time, most of the combined values at the discrete intervals fall outside the predetermined range. Thus, an embodiment of the present invention includes a processor with logic to determine whether a substantial number of the combined values fall within the predetermined range or whether a substantial number of combined values fall outside the predetermined range, and thus determine whether the vehicle is driving on a shoulder/center rumble strip or an in-lane rumble strip, respectively.

It is further noted that one or more of the embodiments described herein may be used in combination with a road departure warning and/or avoidance system and/or a collision warning and/or collision avoidance system. Indeed, the algorithms of FIGS. 6 and 7 are directed, at least in part, towards this possible application. Such application of the present invention shall now be described by way of exemplary scenarios.

In a first applicable scenario, a vehicle equipped with a device according to an embodiment of the present invention is driving down a road having shoulder rumble strips thereon, and a vehicle tire eventually encounters rumble strips, as exemplary depicted in FIG. 2. In this scenario, the rumble strips are shoulder rumble strips arrayed on the right side of the road, although at this point in the scenario the device on-board the vehicle according to one or more of the embodiments described herein has not yet determined the type of rumble strip and/or location of the rumble strip. The device on-board the vehicle then receives input indicative of contact with a rumble strip. During contact of the front right vehicle tire with the rumble strip, the rotational speed of the right front vehicle tire oscillates. However, the rotational speed of the front left vehicle tire does not oscillate. (In this embodiment the vehicle is a rear-wheel drive vehicle. Were the vehicle a four-wheel drive vehicle and/or an all-wheel drive vehicle, the left front tire would likely oscillate as noted above.) The device analyzes the rotational speeds of the front left and right tires and compares the two and determines that the vehicle is in contact with a shoulder rumble strip. In the present scenario, the vehicle further determines that the rumble strip is a right side rumble strip, based on, for example, the analysis of the change in rotational speeds of the tire(s), although other scenarios utilizing embodiments of the present invention may not make such a determination. Based on these determinations, a road departure warning and/or a road departure avoidance system is activated on-board the vehicle. Examples of such systems are described in co-pending U.S. patent application Ser. Nos. 10/811,148 and 10/811,149, filed on Mar. 29, 2004, both to the present inventors and both entitled Rumble Strip Responsive Systems, the contents of which are incorporated herein by reference in their entirety.

In another scenario utilizing an embodiment of the present invention, the vehicle instead encounters in-lane rumble strips. The vehicle, having been equipped with an embodiment of the device as described herein, recognizes contact of one or more of the tires with the rumble strips and analyzes the rotational speeds of the front right and front left tires. From this analysis, a determination is made that the vehicle tires are in contact with an in-lane rumble strip. Since such in-lane rumble strips are indicative of a approach to, for example, a toll installation and/or narrowing of highways ("End Of Expressway") and/or a heightened caution zone, etc., a determination is made that a crash could be imminent, and thus a collision warning and/or collision avoidance system is activated, such as, for example, those described in co-pending U.S. patent application Ser. Nos. 10/811,148 and 10/811,149.

It will be noted that additional logic may be implemented in embodiments of the present invention, such that vehicle dynamics and/or current vehicle situational information may be combined with type of rumble strip and/or rumble strip location determination information to make a determination as to whether a vehicle is departing from a road and/or whether the vehicle is in a situation of imminent collision with infrastructure such as a toll booth. For example, in the just described scenario, where the vehicle is in contact with in-lane rumble strips, if an on-board computer recognizes that the vehicle has decelerated from, for example 50 miles per hour to 5 miles per hour, just before contacting the in-lane rumble strips, the computer may make a determination that the driver has recognized the situational status of the vehicle, and thus collision avoidance measures are not implemented. Instead, a warning to the driver may be issued to ensure that the driver is indeed aware of the situational status of the vehicle. Alternatively, if the driver contacts in-lane rumble strips, at, for example, 50 miles per hour and/or there is no prior reduction in speed prior to contacting the in-lane rumble strips, the computer may determine that a collision avoidance system should be automatically implemented.

The present invention includes methods of practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "vehicle" as used herein encompasses cars, trucks, SUVs, minivans, and all other types of land vehicles operating on public roadways.

It is noted that the term "processor," as used herein, encompasses both simple circuits and complex circuits, as well as computer processors.

It is also noted that the term "logic," as used herein, encompasses both hardware, firmware, and software to implement logic.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A device adapted to automatically identify a type of rumble strip, comprising:
   a processor adapted to receive at least a first signal indicative of at least a state of rotation of a first vehicle tire and second signal indicative of a state of rotation of a second vehicle tire, wherein at least one of the first vehicle tire and the second vehicle tire is in contact with a rumble strip;
   wherein the processor includes logic to:
   compare the state of rotation of the first vehicle tire to the state of rotation of the second vehicle tire and determine from the comparison a type of rumble strip in contact with at least one of the first vehicle tire and the second vehicle tire.

2. The device of claim 1, wherein the processor further includes logic to:
   analyze input indicative of contact of at least one vehicle tire with a rumble strip; and
   determine from the analysis of the input whether the input is indicative of tire contact with the rumble strip.

3. The device of claim 2, wherein the input indicative of contact of at least one vehicle tire with a rumble strip includes input indicative of at least a state of rotation of a first vehicle tire and a state of rotation of a second vehicle tire.

4. The device of claim 2, wherein the first signal is indicative of at least one of a rotation speed and a change in rotation speed of the first vehicle tire, and wherein the second signal is indicative of at least one of a rotation speed and a change of rotation speed of the second vehicle tire, and wherein the processor further includes logic to at least one of:
    i—compare the rotation speed of the first vehicle tire to the rotation speed of the second vehicle tire and determine from the comparison a type of rumble strip in contact with at least one of the first vehicle tire and the second vehicle tire; and
    ii—compare the change in rotation speed of the first vehicle tire to the change in rotation speed of the second vehicle tire and determine from the comparison a type of rumble strip in contact with at least one of the first vehicle tire and the second vehicle tire;
    wherein the processor includes logic to output data indicative of the determination of the type of rumble strip, and wherein the processor is adapted to output a signal indicative of the determination of the type of rumble strip.

5. The device of claim 4, wherein if the processor includes logic to execute "i," the logic further includes logic to:
    identify a plurality of first values corresponding to rotation speeds of the first vehicle tire and identify a plurality of second values corresponding to rotation speeds of the second vehicle tire substantially respectively corresponding temporally to the plurality of first values; and
    compare a substantial number of first values to respective second values during the comparison of "i," and if a substantial number of the respective first values and second values are determined to be substantially different from each other, determine that the rumble strip is a shoulder/center rumble strip, and if a substantial number of the respective first values and second values are determined to be substantially similar to each other, determine that the rumble strip is an in-lane rumble strip; and
    wherein if the processor includes logic to execute "ii," the logic further includes logic to:
        identify a plurality of third values corresponding to changes of rotation speeds of the first vehicle tire and identify a plurality of fourth values corresponding to changes of rotation speeds of the second vehicle tire substantially respectively corresponding temporally to the plurality of third values; and
        compare a substantial number of third values to respective fourth values during the comparison of "ii," and if a substantial number of the respective third values and fourth values are determined to be substantially different from each other, determine that the rumble strip is a shoulder/center rumble strip, and if a substantial number of the respective third values and fourth values are determined to be substantially similar to each other, determine that the rumble strip is an in-lane rumble strip.

6. The device of claim 5, wherein the device is adapted so that the substantial number of first values and second values will not be cycle-coincidence values, and wherein the device is adapted so that the substantial number of third values and fourth values will not be cycle-coincidence values.

7. The device of claim 5, wherein the processor is further adapted to receive input indicative of whether the first and second vehicle tires are free-wheeling tires or driven tires, and wherein the processor further includes logic to:
    determine that the input is indicative of free-wheeling first and second vehicle tires; and
    only if the determination is made that the input is indicative of free-wheeling first and second vehicle tires, output the signal indicative of the determination of the type of rumble strip.

8. The device of claim 5, wherein the processor is further adapted to receive input indicative of whether the first and second vehicle tires are free-wheeling tires or driven tires, and wherein the processor further includes logic to:
    determine that the input is indicative of driven first and second vehicle tires; and
    only if the determination is made that the input is indicative of driven first and second vehicle tires, output the signal indicative of the determination of the type of rumble strip.

9. The device of claim 1, wherein the processor is adapted to receive input indicative of whether at least one of the first vehicle tire and the second vehicle tire is in free-wheel mode or in driven mode, wherein the first signal is indicative of a rotation speed of the first vehicle tire, wherein the second signal is indicative of a rotation speed of the second vehicle tire, and wherein the processor includes logic to:
    determine whether at least one of the first vehicle tire and the second vehicle tire is in free-wheel mode or in driven mode;
    identify a substantial number of first values corresponding to rotation speeds of the first vehicle tire and identify a substantial number of second values corresponding to rotation speeds of the second vehicle tire substantially respectively corresponding temporally to the plurality of first values;
    compare a substantial number of first values to respective second values and determine whether a substantial number of respective first values and second values are substantially different from each other; and
    if a determination is made that at least one of the first vehicle tire and the second vehicle tire is in a free-wheel mode, and if a determination is made that a substantial number of respective first values and second values are substantially different from each other, determine that the rumble strip is a shoulder/center rumble strip and output a signal indicative of a determination that the rumble strip is a shoulder/center rumble strip.

10. The device of claim 9, wherein the processor includes logic to:
    if a determination is made that at least one of the first vehicle wheel and the second vehicle wheel is in a free-wheel mode, and if a determination is made that a substantial number of respective first values and second values are substantially similar to each other, determine that the rumble strip is an in-lane rumble strip and output a signal indicative of a determination that the rumble strip is an in-lane rumble strip.

11. The device of claim 9, wherein the processor includes logic to:
    determine that at least one of the first vehicle tire and the second vehicle tire is in contact with a rumble strip if a substantial number of at least one of (i) the first values and (ii) the second values vary in an oscillatory manner over a predetermined time period when an RPM of a vehicle engine is substantially constant, and output a signal indicative of a determination that a rumble strip is in contact with at least one of the first vehicle tire and the second vehicle tire.

12. The device of claim 1, wherein the processor is adapted to receive input indicative of whether at least one of the first vehicle tire and the second vehicle tire is in free-wheel mode or in driven mode, wherein the first signal is indicative of a rotation speed of the first vehicle tire, wherein the second signal is indicative of a rotation speed of the second vehicle tire, and wherein the processor includes logic to:
- determine whether at least one of the first vehicle tire and the second vehicle tire is in free-wheel mode or in driven mode;
- identify a substantial number of first values corresponding to rotation speeds of the first vehicle tire and identify a substantial number of second values corresponding to rotation speeds of the second vehicle tire substantially respectively corresponding temporally to the plurality of first values;
- compare a substantial number of first values to respective second values and determine whether a substantial number of respective first values and second values are substantially different from each other; and
- compare a substantial number of second values to each other and determine whether a substantial number of the second values are substantially similar to each other; and
- if a determination is made that at least one of the first vehicle wheel and the second vehicle wheel is in a free-wheel mode, if a determination is made that a substantial number of the second values are substantially similar to each other, and if a determination is made that a substantial number of respective first values and second values are substantially different from each other, determine that the rumble strip is a shoulder/center rumble strip and output a signal indicative of a determination that the rumble strip is a shoulder/center rumble strip.

13. The device of claim 12, wherein the processor includes logic to:
- if a determination is made that at least one of the first vehicle wheel and the second vehicle wheel is in a free-wheel mode, if a determination is made that a substantial number of the second values are substantially similar to each other, and if a determination is made that a substantial number of respective first values and second values are substantially similar to each other, determine that the rumble strip is an in-lane rumble strip and output a signal indicative of a determination that the rumble strip is an in-lane rumble strip.

14. The device of claim 9, wherein the processor includes logic to:
- determine that at least one of the first vehicle tire and the second vehicle tire is in contact with a rumble strip if a substantial number of at least one of the first values and the second values vary in an oscillatory manner over a predetermined time period when an rpm of a vehicle engine is substantially constant, and output a signal indicative of a determination that a rumble strip is in contact with at least one of the first vehicle tire and the second vehicle tire.

15. The device of claim 1, wherein the processor is adapted to receive input indicative of whether at least one of the first vehicle tire and the second vehicle tire is in free-wheel mode or in driven mode, wherein the first signal is indicative of a rotation speed of the first vehicle tire, wherein the second signal is indicative of a rotation speed of the second vehicle tire, and wherein the processor includes logic to:
- determine whether at least one of the first vehicle tire and the second vehicle tire is in free-wheel mode or in driven mode;
- identify a first pattern corresponding to rotation speeds of the first vehicle tire over a first predetermined period and identify a second pattern corresponding to rotation speeds of the second vehicle tire over the first predetermined period,
- compare the first pattern to the second pattern with respect to phase and determine whether the first pattern is substantially different in phase from the second pattern; and
- if a determination is made that at least one of the first vehicle tire and the second vehicle tire is in a driven mode, and if a determination is made that the first pattern is substantially different in phase from the second pattern, determine that the rumble strip is a shoulder/center rumble strip and output a signal indicative of a determination that the rumble strip is a shoulder/center rumble strip.

16. The device of claim 15, wherein the processor includes logic to:
- if a determination is made that at least one of the first vehicle tire and the second vehicle tire is in a driven mode, and if a determination is made that the first pattern is substantially similar to the second pattern in phase, determine that the rumble strip is an in-lane rumble strip and output a signal indicative of a determination that the rumble strip is an in-lane rumble strip.

17. The device of claim 12, wherein the processor includes logic to:
- determine that at least one of the first vehicle tire and the second vehicle tire is in contact with a rumble strip if a substantial number of at least one of the first values and the second values vary in an oscillatory manner over a predetermined time period when an rpm of a vehicle engine is substantially constant during that predetermined time period, and output a signal indicative of a determination that a rumble strip is in contact with at least one of the first vehicle tire and the second vehicle tire.

18. A device adapted to automatically identify a type of rumble strip, comprising:
- a processor adapted to receive at least a first signal indicative of a rotation speed of a first vehicle tire and a second signal indicative of a rotation speed of a second vehicle tire, and to receive input indicative of whether at least one of the first vehicle tire and the second vehicle tire is in free-wheel mode or in driven mode, wherein at least one of the first vehicle tire and the second vehicle tire is in contact with a rumble strip;
- wherein the processor includes logic to:
  - identify a substantial number of first values corresponding to rotation speeds of the first vehicle tire and identify a substantial number of second values corresponding to rotation speeds of the second vehicle tire substantially respectively corresponding temporally to the plurality of first values;
  - identify a substantial number of third values which are equivalent to adding first values and respective second values;
  - determine whether a substantial number of third values fall outside a predetermined threshold range;
  - if a substantial number of third values fall outside the predetermined range, and if input has been received indicative of at least one of the first vehicle tire and the second vehicle tire are in a driven mode, output a signal indicative of a determination that at least one of the first and second vehicle tires are in contact with in-lane rumble strips;

if a substantial number of third values fall inside the predetermined range, and if input has been received indicative of at least one of the first vehicle tire and the second vehicle tire are in a driven mode, output a signal indicative of a determination that at least one of the first and second vehicle tires are in contact with shoulder/center rumble strips.

19. A device adapted to automatically identify a type of rumble strip, comprising:

a processor adapted to receive at least a first signal indicative of a rotation speed of the first vehicle tire and second signal indicative of a rotation speed of a second vehicle tire, wherein at least one of the first vehicle tire and the second vehicle tire is in contact with a rumble strip;

wherein the processor includes logic to:

determine whether at least one of the first vehicle tire and the second vehicle tire is in contact with a rumble strip based on at least one of (i) the first signal, (ii) the second signal, and (iii) additional input;

identify a substantial number of first values corresponding to rotation speeds of the first vehicle tire and identify a substantial number of second values corresponding to rotation speeds of the second vehicle tire substantially respectively corresponding temporally to the plurality of first values;

identify a first pattern of first values over a predetermined period of time and identify a second pattern of second values temporally respective to the first values over the predetermined period of time;

determine whether the first pattern is substantially similar to the second pattern, and if a determination is made that at least one of the first vehicle tire and the second vehicle tire is in contact with a rumble strip and if a determination is made that the first pattern is substantially similar to the second pattern, output a signal indicative of a determination that at least one of the first and second vehicle tires are in contact with in-lane rumble strips.

20. The device of claim 19, wherein the processor further includes logic to:

if a determination is made that at least one of the first vehicle tire and the second vehicle tire is in contact with a rumble strip and if a determination is made that the first pattern is substantially different to the second pattern, output a signal indicative of a determination that at least one of the first and second vehicle tires are in contact with shoulder/center rumble strips.

21. The device of claim 19, wherein the processor further includes logic to:

identify an amplitude of the first pattern and an amplitude of the second pattern;

determine whether the amplitude of the first pattern is substantially similar to the amplitude of the second pattern, and if a determination is made that at least one of the first vehicle tire and the second vehicle tire is in contact with a rumble strip, and if a determination is made that the amplitude of the first pattern is substantially similar to the amplitude of the second pattern, and if no determination is made that the first pattern is substantially similar to the second pattern, output a signal indicative of a determination that at least one of the first and second vehicle tires are in contact with shoulder/center rumble strips.

22. The device of claim 21, wherein the processor further comprises logic to:

determine at least one of:
(i) which of the first vehicle tire and the second vehicle tire is in contact with a rumble strip; and
(ii) which of the first vehicle tire and the second vehicle tire is not in contact with a rumble strip.

23. The device of claim 21, wherein the processor further comprises logic to:

determine at least one of:
(i) which of the first vehicle tire and the second vehicle tire is in contact with a rumble strip based on the amplitude of at least one of the first pattern and the second pattern; and
(ii) which of the first vehicle tire and the second vehicle tire is not in contact with a rumble strip based on the amplitude of at least one of the first pattern and the second pattern.

24. A vehicle, comprising:
a chassis; and
a device according to claim 1.

25. A device according to claim 1, wherein the processor includes logic to compare a first pattern corresponding to rotation speeds of the first vehicle tire over a first predetermined period to a pattern of rotation speeds of the second vehicle tire over the first predetermined period, and if a determination is made that the first pattern is substantially different in phase from the second pattern, output a signal indicative of a determination that the rumble strip is a shoulder/center rumble strip.

26. A device according to claim 1, wherein the processor is adapted to identify a first pattern corresponding to rotation speeds of the first vehicle tire over a first predetermined period and identify a second pattern corresponding to rotation speeds of the second vehicle tire over the first predetermined period;

wherein the processor includes logic to:
compare the first pattern to the second pattern with respect to phase and determine whether the first pattern is substantially different in phase from the second pattern; and if a determination is made that the first pattern is substantially different in phase from the second pattern, determine that the rumble strip is a shoulder/center rumble strip and output a signal indicative of a determination that the rumble strip is a shoulder/center rumble strip.

* * * * *